US012537899B1

(12) United States Patent
Bernabe et al.

(10) Patent No.: US 12,537,899 B1
(45) Date of Patent: Jan. 27, 2026

(54) PROPERTY MODIFICATION DURING COMMUNICATION SESSION

(71) Applicant: Zoom Communications, Inc., San Jose, CA (US)

(72) Inventors: William Thomas Bernabe, Northborough, MA (US); Benjamin Joseph DeStephen, Hilliard, OH (US); George John Thomas, Pleasanton, CA (US)

(73) Assignee: Zoom Communications, Inc., San Jose, CA (US)

( * ) Notice: Subject to any disclaimer, the term of this patent is extended or adjusted under 35 U.S.C. 154(b) by 234 days.

(21) Appl. No.: 18/462,554

(22) Filed: Sep. 7, 2023

(51) Int. Cl.
*H04M 3/51* (2006.01)
*H04M 1/50* (2006.01)

(52) U.S. Cl.
CPC ........... *H04M 3/5183* (2013.01); *H04M 1/50* (2013.01)

(58) Field of Classification Search
CPC .............................. H04M 3/5183; H04M 1/50
USPC ................. 379/265.09, 265.02, 242, 265.01
See application file for complete search history.

(56) References Cited

U.S. PATENT DOCUMENTS

| 7,523,859 | B2 | 4/2009 | Patel et al. |
| 9,787,835 | B1 | 10/2017 | Pycko et al. |
| 10,205,827 | B1 | 2/2019 | Pycko et al. |
| 10,833,920 | B1 | 11/2020 | Ramanadham et al. |
| 11,689,668 | B1 | 6/2023 | Mathis et al. |
| 2004/0086100 | A1* | 5/2004 | Moore ................... H04M 15/55 709/204 |
| 2011/0158129 | A1* | 6/2011 | Liu ........................ H04L 65/103 370/352 |
| 2021/0183374 | A1 | 6/2021 | Thomson |

FOREIGN PATENT DOCUMENTS

JP          6208906 B1    10/2017

OTHER PUBLICATIONS

YouTube, PCI Pal Digital—How Does it Work?, https://www.youtube.com/watch?v=g7SN6Jjo118, PCI PAL, Mar. 15, 2021, 2 pages.
Tao, Zen, and Tomorrow, A multimodal blog by Andrew Prokop, Understanding Sip Re-Invite, https://andrewjprokop.wordpress.com/2015/02/10/understanding-sip-re-invite/, Andrew Prokop, Feb. 10, 2015, 10 pages.

* cited by examiner

*Primary Examiner* — Thjuan K Addy
(74) *Attorney, Agent, or Firm* — Young Basile Hanlon & MacFarlane, P.C.

(57) ABSTRACT

A communication session is established between a device of a first user and a device of a second user. An input is received during the communication session from the device of the first user. The input indicates a request to update an original property of the communication session associated with a path of media communication between the device of the first user and the device of the second user. An external bypass step handler associated with the input is identified. The external bypass step handler is communicated with to update the original property of the communication session to obtain a modified property. The communication session is continued with the modified property.

20 Claims, 9 Drawing Sheets

PROPERTY MODIFICATION DURING COMMUNICATION SESSION

FIELD

This disclosure generally relates to call management, and, more specifically, to associating workflows between multiple disparate systems.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
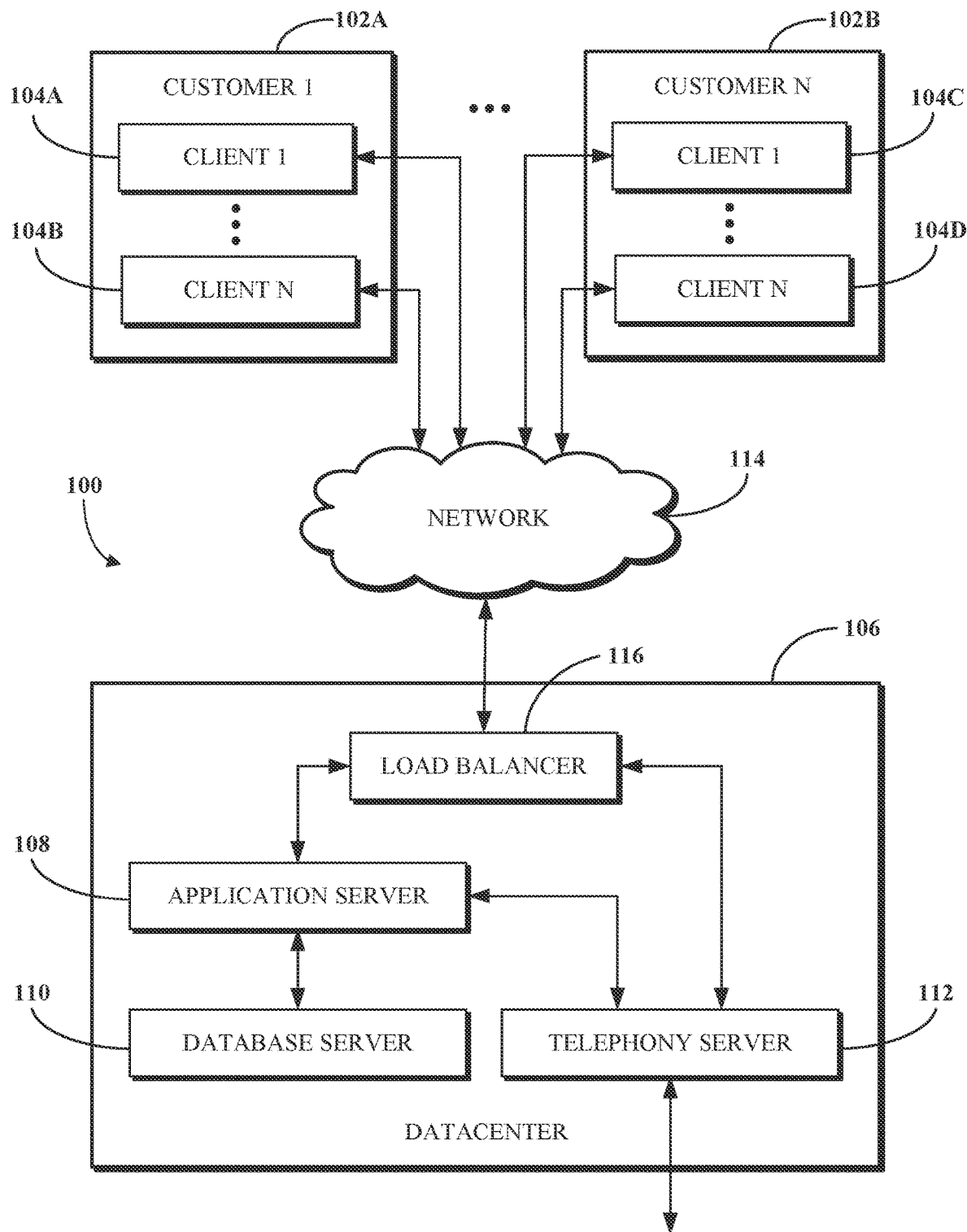
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform or a contact center as a service (CCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

In a conventional contact center environment, an agent is typically set up to receive incoming communications from customers where the agent would be logged into a contact center application using an agent-specific device. It is noted that, in this context, "customer" refers, for example, to a retail customer and does not mean a "customer" as used with respect to FIG. 1. The contact center application (e.g., via a UCaaS or a CCaaS platform) routes customer calls to the agent.

In an illustrative, non-limiting example, the agent may be engaged with a customer in a call to fulfil a customer order. As such, the agent may also be connected to an Order Management System (OMS) or another relevant system, such as a Customer Relationship Management (CRM) system, which facilitates the process of capturing orders from customers. As the call progresses to a point where it becomes necessary to gather payment details, the agent can integrate (e.g., invoke or inject) a payment processing system into the ongoing call. The payment processing system may be a third-party system that is independent of the UCaaS or CCaaS platform and is responsible for collecting payment data, such as credit card numbers, directly from the customer. More broadly, a step (e.g., a process or a workflow) in an agent-customer engagement that is to be performed or executed by or at a third-party server is referred to herein as an "external bypass step." Given the agent's logged status (e.g., identifiable and traceable), the customer-agent call can be seamlessly correlated with the external bypass step. Consequently, the agent (e.g., the agent device) can be segregated while the payment processing system obtains payment information. More broadly, the agent can be segregated while the external bypass step is being executed or performed.

The above described set up ensures that at no point does the agent have direct access to, or the ability to intercept or hear, the financial credentials of the customer, thereby reinforcing data privacy and security. Additionally, in such a setup, the UCaaS or CCaaS can facilitate the association of the call to at least one of the OMS or the payment processing system. This is so since, again, the agent is logged in to the UCaaS or CCaaS and the UCaaS or CCaaS may have integrated capabilities to synchronize with both the OMS and the payment processing system, ensuring a seamless workflow. Thus, this architecture or configuration requires that the call is traceable and connectable to the transaction or order.

However, in some situations, a call between an agent and a customer may not be traceable (e.g., identifiable by the UCaaS or CCaaS), such as because the agent is not logged in and is thus not identifiable to the UCaaS or CCaaS. Such an agent is referred to herein an un-anchored agent. To illustrate, consider the following scenario in a retail environment, such as an auto parts store. At the auto parts store, five employees staff the front desk, answering phone calls and assisting walk-in customers. Any one of the employees might pick up a wall-mounted phone when a customer calls to place an order. The employee may take the order information at a point-of-sale (POS) terminal connected to a backend OMS. The POS terminal may be situated at the front desk and may be usable by any of the other four employees to take orders.

At least three problems arise in this situation: First, how can the customer's payment information be securely handled by a payment processor without exposing such information to the agent? That is, how can the payment processor be integrated into such a call? Second, how can the phone call be linked (e.g., correlated) to the corresponding transaction in the OMS and/or the payment processing system? Third, the call between the agent and the customer may be enabled by a cloud-based telephony system (e.g., a hosted Private Branch Exchange (PBX)) provided by a PBX provider. If the employee were to take the payment information from the customer for entry into the POS system, then that information would necessarily pass through at least one system (e.g., server) of the PBX provider, which in turn may trigger extensive auditing and compliance requirements on the PBX provider, which in turn is undesirable from the perspective of the PBX provider.

Implementations of this disclosure address problems such as these by updating a communication path between an agent (e.g., an un-anchored agent) and a customer mid-engagement so that an external bypass step can be integrated into the engagement. An un-anchored agent using an agent device and engaged in a communication session, enabled by a software platform, with another user (e.g., a customer) using a user device can enter an input (referred to herein as "external bypass step indicator") at the agent device. The software platform interprets the external bypass step indicator as an indication to invoke the external bypass step (e.g., to request that the third-party system perform the external bypass step). The external bypass step indicator may be a Dual tone multi-frequency (DTMF) key sequence that the un-anchored agent enters using a keypad of the agent device.

In some implementations, the software platform may modify one or more properties of the engagement (e.g., the communication session) to enable the external bypass step to be carried out (e.g., performed or executed). For example, the media path of the communication session may be changed so that the media is not received at the PBX provider. The software platform may use the external bypass step indicator to associate (or facilitate the association of) workflows between multiple disparate systems, such as between an OMS and a third-party system (also referred to herein as an "external bypass step handler") performing the external bypass step. After the external bypass step is completed, the properties are reset. For example, the original state and/or media flow is resumed. Different external bypass step indicators at the agent device may invoke different external bypass steps.

Accordingly, implementations according to this disclosure allow devices not associated with agents (e.g., a device used by an un-anchored agent during an engagement) to be properly identified so that external bypass steps can be property integrated into engagements.

While the disclosure herein is mostly described with respect to un-anchored agent inputs that are DTMF key sequences, the disclosure herein is not so limited. For example, when considering communication sessions of different types, the nature of the input can vary accordingly. In the case that the communication session is a chat session, the input may manifest as chat commands presented in a "slash" or like style format. To illustrate, and without limitations, where a DTMF key sequence may be *12, a corresponding slash style input may be /12. In the case that the communication session is a video session that is enabled via a video interface, the input mechanism could be the activation of user interface icons or buttons. Additionally, while the disclosure herein may be used in the context of or using a UCaaS or a CCaaS, the disclosure is not so limited.

To describe some implementations in greater detail, reference is first made to examples of hardware and software structures that can be used to implement a system for call flow modification based on un-anchored agent input and/or property modification of a communication session during the communication session. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
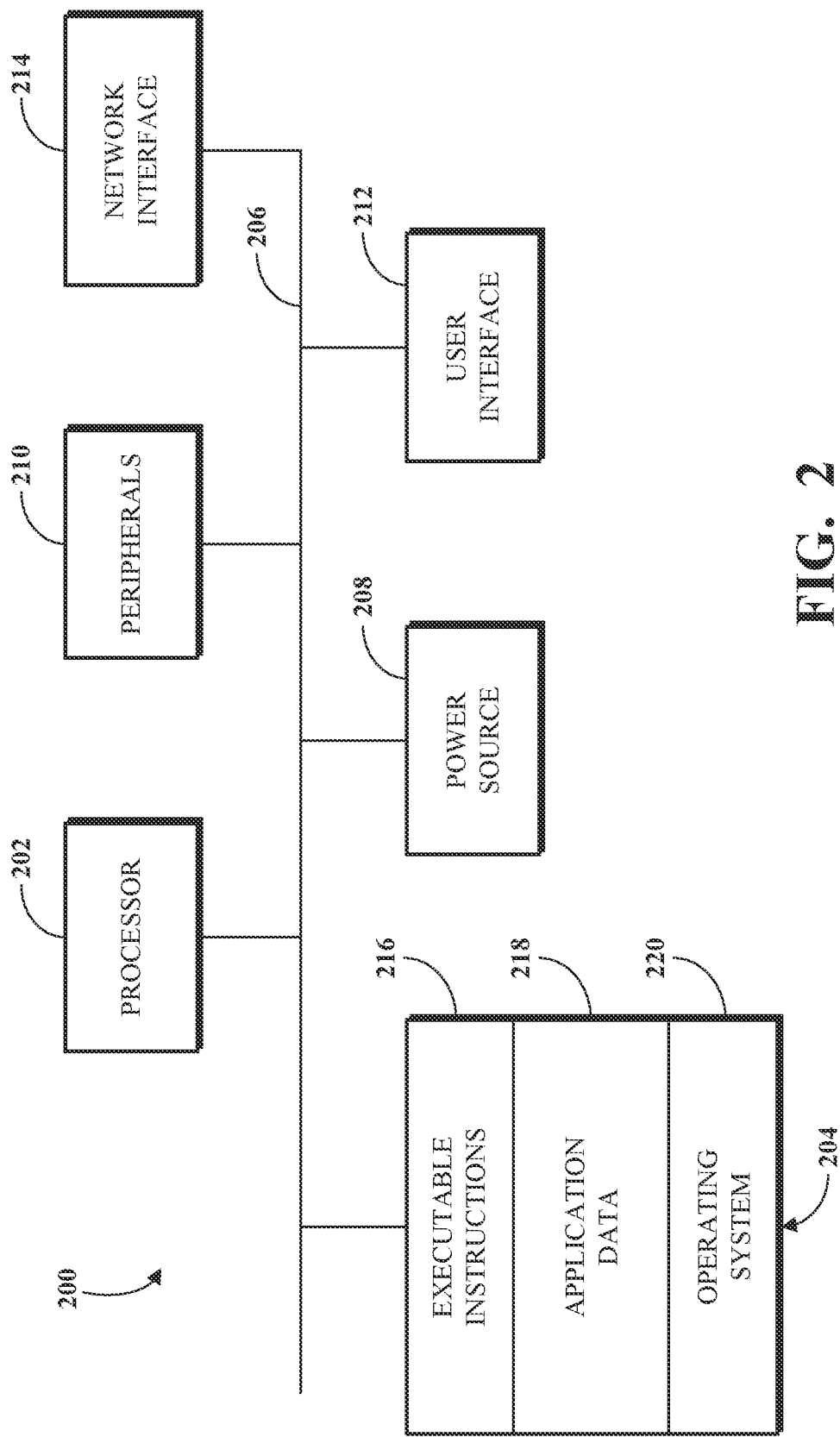
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
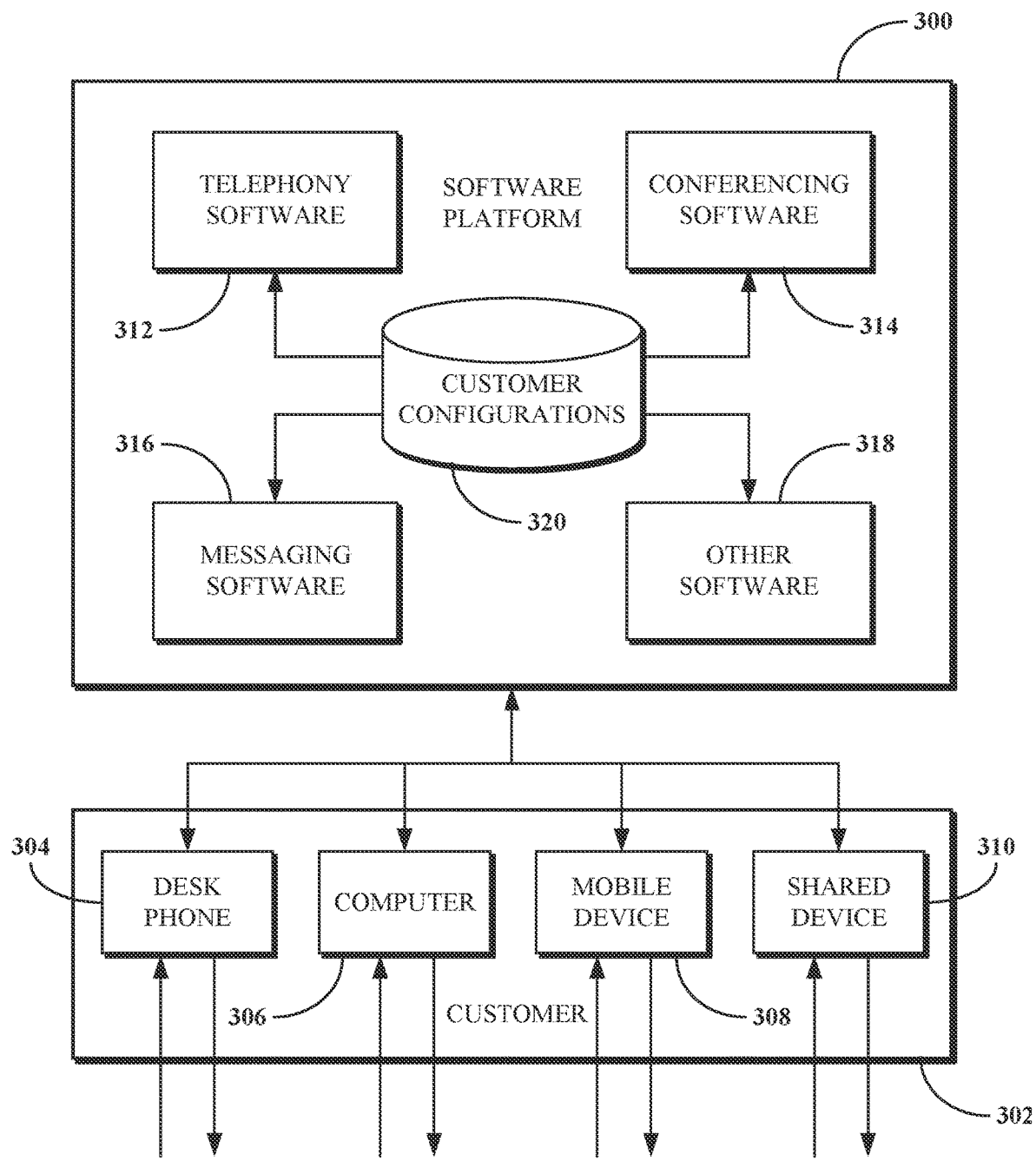
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310) — a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a un-anchored agent handler that can be used for call flow modification based on un-anchored agent input and/or property modification of a communication session during the communication session.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
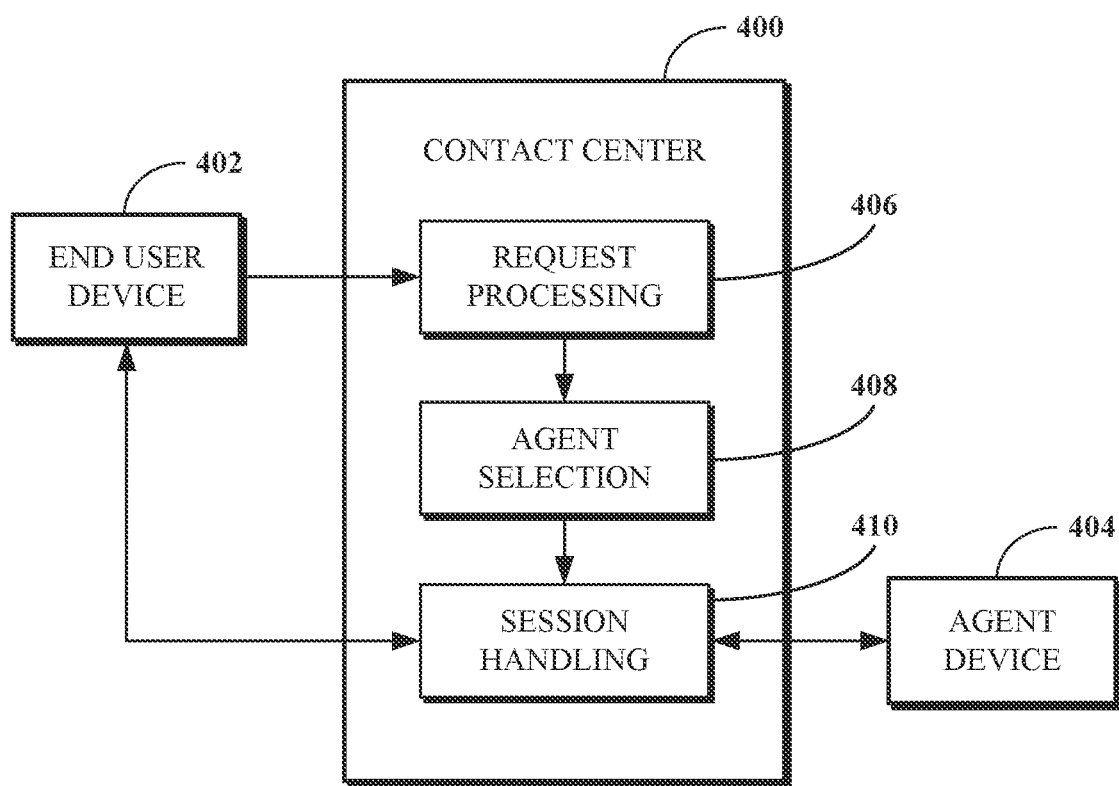
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
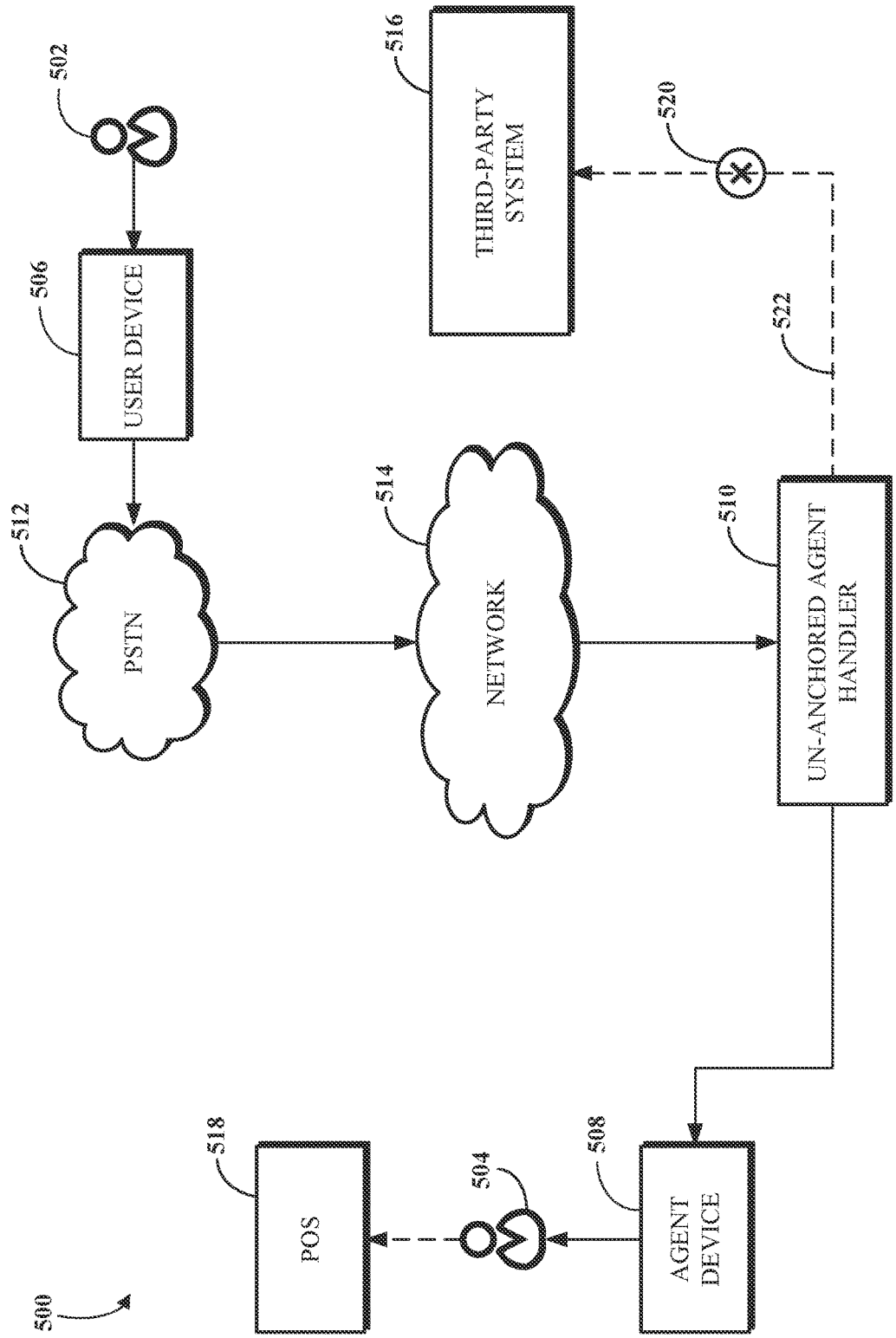
FIG. 5 is a block diagram illustrating an environment where the need for invoking an external bypass step arises.

FIG. 5 is a block diagram illustrating an environment 500 where the need for invoking an external bypass step arises. The environment 500 illustrates that a user 502 (e.g., a retail customer) and an agent 504 are engaged in a communication session (or "an engagement") via a user device 506 and an agent device 508, respectively. To illustrate, the user 502 may be engaged with the agent 504 to purchase a product or service. The communication session may be a telephony session. As such, the user device 506 may be a telephony device (e.g., an end user device configured to initiate, facilitate, or otherwise connect to a telephone call) and the agent device 508 may also be a telephony device. However, that need not be the case and the communication session can be a video-based communication session, a chat-based communication session, an augmented or virtual reality communication session. The user device 506 and the agent device 508 may also be referred as endpoints.

In the illustrated scenario of FIG. 5, the agent 504 is an un-anchored agent. That is, the agent 504 handling the call received from the user 502 is not recognizable to (e.g., identifiable by) an un-anchored agent handler 510 or the call from the user 502 was not specifically routed by the un-anchored agent handler 510 to the agent 504 (or more accurately, to a device specifically associated to the agent 504).

The agent 504 may be an employee of a customer (as used with respect to FIG. 1) that uses at least some of the services of the software platform 300 of FIG. 3, and/or a customer of the contact center 400 of FIG. 4. As such, the un-anchored agent handler 510 may be all or a subset of the software platform 300 of FIG. 3 and/or may be or may be included in the contact center 400 of FIG. 4. The un-anchored agent handler 510 may be other software 318 of FIG. 3. The un-anchored agent handler 510 provides telephony software and may include or work in conjunction with a PBX, which can be as described with respect to FIG. 1. The un-anchored agent handler 510 may be implemented using an application server, a database server, and/or a telephony server, such as the servers 108 through 112 shown in FIG. 1.

Establishing the path (e.g., the media path) of the engagement between the user 502 and the agent 504 (e.g., between their respective devices) occurs at the beginning of the call (e.g., at the time that the connection is established). To illustrate, when the user 502 dials (on the user device 506) a telephone number that is ultimately routed by the un-anchored agent handler 510 to the agent device 508, the call may be first connected to a PSTN 512 and is routed through a series of switches (over a network 514), establishing a circuit between the user device 506 and the un-anchored agent handler 510. The un-anchored agent handler 510 in turn transmits the media to the agent device 508. That a circuit is established with the un-anchored agent handler 510 can include that the circuit is established with a PBX included in or associated with the un-anchored agent handler 510. For ease of reference, statements herein such as "the un-anchored agent handler 510 (or a PBX therein)" should be understood to mean that the PBX is included in the un-anchored agent handler 510, is associated with the un-anchored agent handler 510, or works in conjunction with the un-anchored agent handler 510.

This circuit remains active for the duration of the call, ensuring continuous voice communication between the user 502 and the un-anchored agent handler 510. The media (e.g., audio) stream traverses through the un-anchored agent handler 510. More broadly, any data that exits the user device 506 arrives at the un-anchored agent handler 510, and unless blocked by the un-anchored agent handler 510, is delivered to the agent device 508. Excluding standard PBX functionality, such as call transfers and conferencing, once a call is active, the properties, including the media path, exchanged during the engagement are static.

As mentioned, an external bypass step in the workflow carried out or pertaining to the communication session between the user 502 and the agent 504 may need to be performed by or at a third-party system 516 (i.e., an external bypass step handler). It is often necessary to identify the particular flow (e.g., the call or related data thereof) in the process of performing the external bypass step, such as to optimize or facilitate the performance of the external bypass step. However, this presents complications since the agent 504 is an un-anchored agent. The un-anchored agent handler solves these complications, as further described with respect to FIGS. 6A-6B.

If the agent 504 were an anchored agent (e.g., where the agent 504 is logged in and is identifiable by the un-anchored agent handler 510), then the agent 504 may, via a device associated therewith, trigger the external bypass step. To illustrate, an application that the agent 504 may be using, and to which the agent 504 is identifiable, may enable the agent 504 to trigger the external bypass step.

However, since the agent 504 is an un-anchored agent, it may not be possible for the agent 504 to trigger the external bypass step and it may not be possible for the external bypass step to identify the call or the agent. For example, as indicated by a symbol 520, it is not possible for the un-anchored agent handler 510 to provide at least sufficient information to the third-party system 516 (along a path 522) so that the external bypass step can be optimized. "Optimizing" an external bypass step is not associated with any particular semantics. The optimizing can have different meanings and implementations based on the specifics of the external bypass steps.

Some external bypass steps may need to be performed in such a way that at least certain data communicated by the user 502 should not be received by the agent 504 and should not arrive at, let alone traverse, the un-anchored agent handler 510. Such external bypass steps are referred to herein as compliance triggering steps, since, if aspects thereof do not bypass the un-anchored agent handler 510, then the operator of the un-anchored agent handler 510 may be subjected to compliance or regulatory requirements.

In the specific scenario illustrated in FIG. 5, the agent 504 may enter order information in a POS 518 associated with and/or communicatively connected to an OMS. However, as the agent 504 is an un-anchored agent and the agent device 508 is not associated with an anchored agent, it can be difficult to associate the engagement, the order entered in the POS 518, and any data resulting from the performance of the external bypass step by the third-party system 516.

Figure 6A:
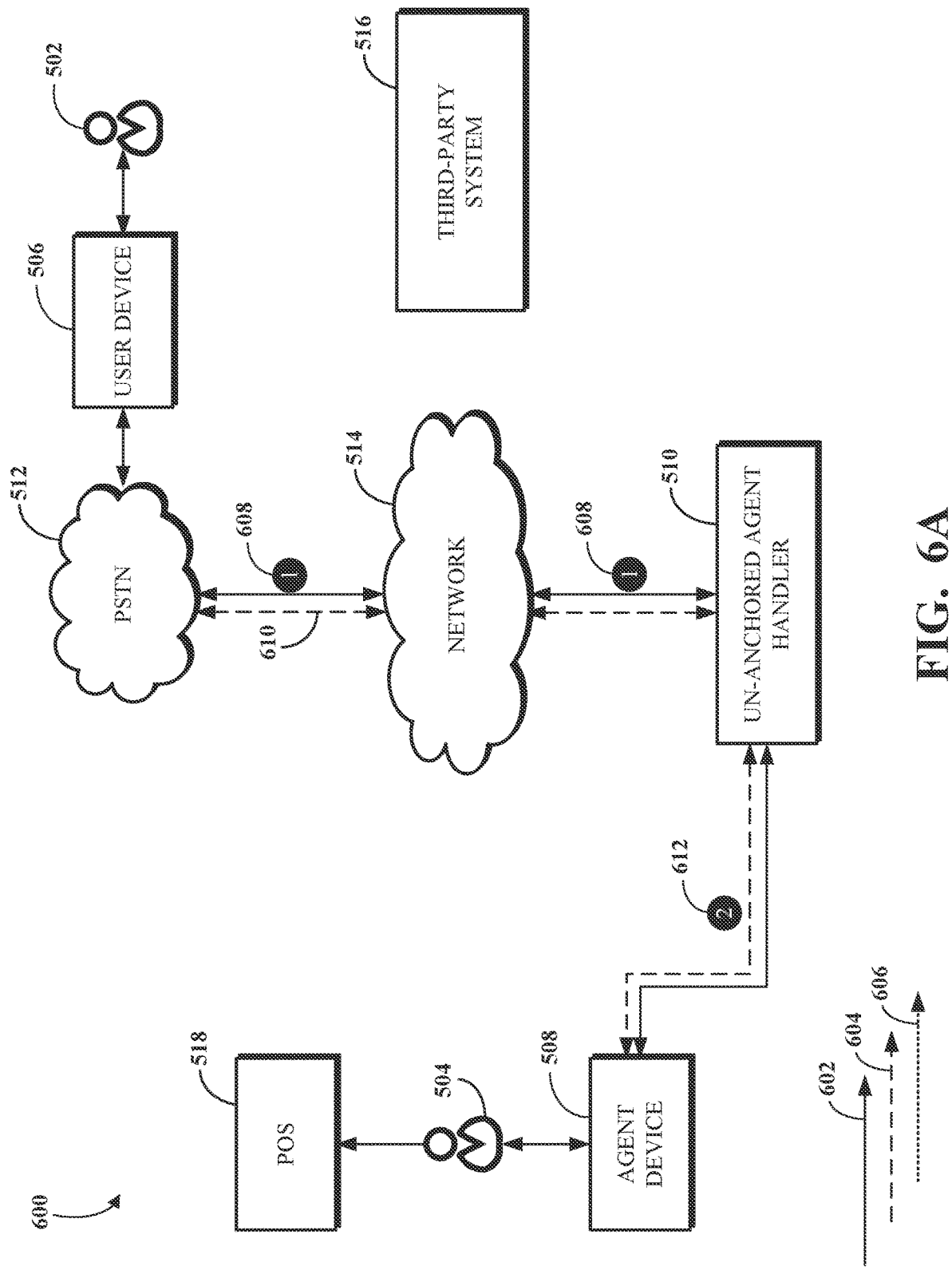
FIGS. 6A-6B describe a process for invoking an external bypass step.
Figure 6B:
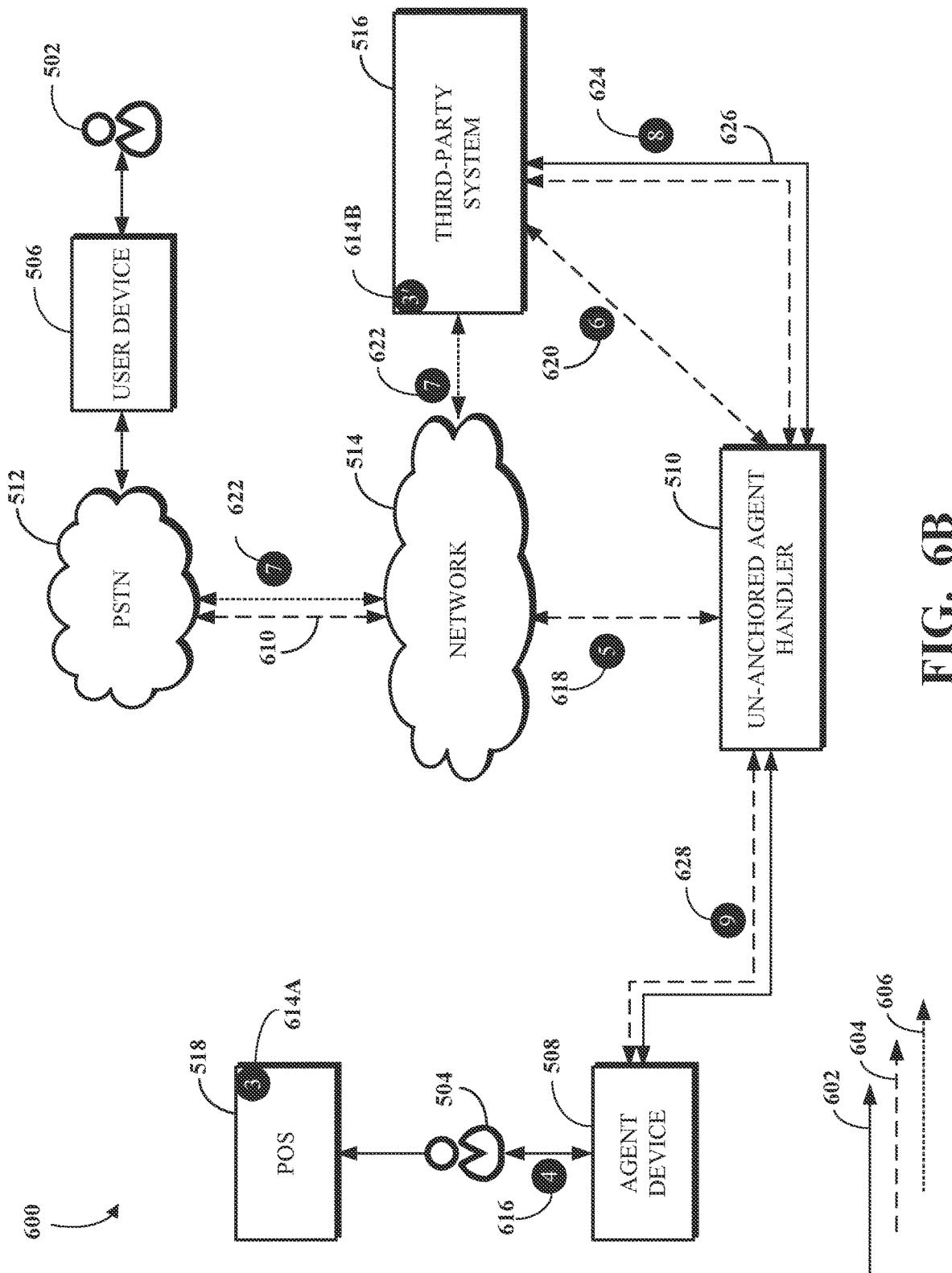

FIGS. 6A-6B describe a process for invoking an external bypass step. Invoking the external bypass step is enabled by the un-anchored agent handler 510. In FIGS. 6A-6B, the same numerals are used to designate corresponding constituents in FIG. 5, and the description thereof may be appropriately omitted. FIGS. 6A-6B include lines (connections) having different patterns. Lines having a pattern 602 indicate or correspond to communication session signaling (e.g., SIP signaling); lines having a pattern 604 indicate or correspond to media data (e.g., an audio stream) transferred during the communication session; and lines having a pattern 606 indicate or correspond to media data that include sensitive data (such as credit card data or personally identifying data).

A communication session is considered to be established when media channels are set up and ready for data transmission. For instance, in the context of a telephony-based communication session, the session is deemed established when audio channels are open (e.g., set up and operational) between the communicating devices. With respect to video-based communication sessions, the session is considered established when video channels, capable of transmitting and receiving visual data, are active and connected between the participating devices. More generally, a communication session, regardless of its medium, is defined by the successful initiation and maintenance of channels that facilitate the interactive exchange of information between the involved entities.

A communication session employs specific protocols to facilitate and standardize the exchange of information. While the disclosure is mainly described herein. The disclosure is not so limited and other protocols are possible. Other examples include Web Real-Time Communication (WebRTC), Real-time Transport Protocol (RTP), Real-Time Streaming Protocol (RTSP), and Extensible Messaging and Presence Protocol (XMPP). In other examples, the communication session may be a TCP-based session, a WebSocket-based session, or the like. These protocols define the methods and conventions for initiating, maintaining, and terminating the communication sessions, ensuring seamless and efficient interactions across diverse platforms and devices. While this disclosure is mainly described with respect to SIP, the teachings herein are not so limited.

A communication session, as used herein, can be any type of communication session and/or one that uses any protocol such that the media exchanged during the communication session can to be rerouted (e.g., redirected) to an alternative destination, diverging from the originally configured destination at the time the communication session was established. The media is rerouted mid-call (or, mid-communication session). That is, the media is rerouted while the communication session is ongoing and after it has been established while allowing the parties to remain connected. As such, the rerouting is not and cannot be considered to be akin to placing a call on hold.

In a step 608 (a step labeled "1"), a telephone call is set up between the user device 506 and the un-anchored agent handler 510 (e.g., the PBX therein). The PSTN 512 receives the call from the user device 506. The PSTN 512 identifies the telephone number (e.g., the DID) that the user 502 is trying to reach. The PSTN 512 sends a SIP message, along a signaling channel 610, to the un-anchored agent handler 510 (e.g., to the PBX therein), informing the PBX of the specific Direct Inward Dialing (DID) phone number and the caller's information. The PBX of the un-anchored agent handler 510 receives the SIP message from the PSTN 512. The PBX determines whether it has a DID that matches the DID in the SIP message. If so, a SIP message is sent back, along the signaling channel 610, to the PSTN 512, informing the PSTN 512 that the DID is valid. The PSTN 512 then connects the call to the PBX. Once the call is connected, the PBX and the PSTN 512 continue to exchange SIP messages to manage the call (e.g., the communication session).

In a step 612 (a step labeled "2") the un-anchored agent handler 510 (e.g., the PBX therein) in turn connects the call to the agent device 508. The PBX may determine which internal extension (the DID) corresponds to the dialed DID number (the number of the agent device 508). The call is then further routed to the appropriate extension or destination.

At this point, the user 502 and the agent 504 can communicate (e.g., speak to each other). That is, media (e.g., audio) data are exchanged over the communication session. The process continues on FIG. 6B when the agent 504 determines, at a point in the call, that an external bypass step is to be completed. In the illustrated flow, the agent 504 determines that payment is needed, which the third-party system 516 is to complete. In one particular and specific example, the agent 504 may have entered order information in the POS 518 and the third-party system 516 may be configured to communicate with the POS 518 (such as via the OMS). However, and as clear from the disclosure, such specific configuration is not necessary to implementing at least some of the teachings herein.

The process described with respect to FIG. 6B can be summarized as follows. The agent 504 uses the POS 518 to initiate payment (e.g., by invoking the external bypass step). The agent 504 may, for example, press a button or enter data in the POS 518, which causes a request for a unique code to be transferred from the POS 518 (such as via the OMS) to the third-party system 516. The unique code (e.g., 1234) received from the third-party system 516 is then displayed at the POS 518. The third-party system 516 may use the unique code to determine which call is to be associated with the user session (at the POS 518), as further described herein.

At a step 614A (a step labeled "3"), via the POS 518, the agent 504 may cause the request for the unique code to be transmitted to the third-party system 516. The request may indicate to the third-party system 516 that it should configure itself for receiving payment information associated with the unique code. As such, at a step 614B (a step labeled "3"), the third-party system 516 configures itself accordingly and transmits the unique code. The unique code may then be displayed at the POS 518.

At a step 616 (a step labeled "4"), the agent 504 enters an external bypass step indicator at the agent device 508. The external bypass step indicator can be a DTMF key sequence (e.g. *12) that is entered on a keypad of the agent device 508.

While not specifically shown in FIG. 6B, the un-anchored agent handler 510 receives the external bypass step indicator (and possibly the unique code as further described herein). The external bypass step indicator indicates to the un-anchored agent handler 510 that the external bypass step is to be invoked.

In response to receiving the external bypass step indicator, the un-anchored agent handler 510 initiates a second call with the third-party system 516 and reconfigures one or more properties of the communication session (e.g., the call) between the user device 506 and the agent device 508 while at the same time the PSTN-based call signaling (indicated by the signaling channel 610 and described with respect to FIG. 6A) remains intact and connected to the un-anchored agent handler 510, as indicated by a step 618 (a step labeled "5"). As such, at a step 620 (a step labeled "6"), the un-anchored agent handler 510 may establish an additional (e.g., the second) call to the third-party system 516 (e.g., a PBX associated therewith).

At a step 622 (a step labeled "7"), properties of the original call are modified. In an example, an additional call leg is established between the un-anchored agent handler 510 and the third-party system 516. For example, the pathing of the media steam (e.g. the voice stream) of the original call can be rerouted to the third-party system 516 (e.g., to the PBX associated therewith). The un-anchored agent handler 510 (e.g., the PBX therein) can act as a SIP intermediary facilitating renegotiation of the destination of the audio stream of the original call between the third-party system 516 (e.g., a PBX therein) and the PSTN 512.

As mentioned herein, the signaling channel between the PSTN 512 and the un-anchored agent handler 510 remains open. The SIP media that is negotiated in the step 622 is relayed via the signaling noted in the step 618 so that the carrier (e.g., the telecommunications service provider that facilitates the transmission of media of communication sessions) remains aware of the new media destination and any other call properties described with respect to the step 622.

The third-party system 516 may prompt the un-anchored agent handler 510 to provide the unique code. The un-anchored agent handler 510 in turn prompts the agent 504 to provide the unique code that is displayed at the POS 518. The agent 504 may enter the unique code via the keypad or may verbally provide (e.g., speak or say) the unique code. Either way, the un-anchored agent handler 510 receives the unique code and transmits the unique code to the third-party system 516. In another example, the un-anchored agent handler 510 may obtain the unique code from the agent 504 prior to setting up the second call and may transmit the unique code in the request to establish the second call.

At a step 624 (a step labeled "8"), the third-party system 516 may transmit a modified media stream to the un-anchored agent handler 510 over a communication channel 626. The un-anchored agent handler 510 in turn may transmit, at step 628 (a step labeled "9"), the modified media stream to the agent device 508. The third-party system 516 may modify the media stream received from the user device 506 to remove sensitive data. For example, the user 502 may enter their credit card data via the keypad of the user device 506. As such, the credit card data is received as DTMF data and the third-party system 516 may block such data (e.g., DTMF data) from being transmitted to the third-party system 516. While not specifically shown in FIG. 6B, a SIP signaling channel is also associated with the step 622. As such, the DTMF data can be received at the third-party system 516 over the SIP channel. In another example, the user 502 may verbally provide their credit card data. In such case, the third-party system 516 may listen for and replace words indicating digits with silence, noise, or some other unintelligible or obfuscated voice data.

After completing the external bypass step, the third-party system 516 may notify the un-anchored agent handler 510 that it has completed the external bypass step. In response to the notification, the un-anchored agent handler 510 reconfigures the media path to the original path (which is as described with respect to FIG. 6A). Reconfiguring the media path can be accomplished via SIP signaling, such as using SIP re-invite messages transmitted over the signaling channel 610. The manipulation (i.e., reconfiguration) of the media path can be achieved using the established control channel of the communication session, which may include, but is not limited to, SIP messaging for voice modalities or APIs over HTTPS for asynchronous modalities. As described herein, other protocols may be used (e.g., WebRTC). As such, and more broadly, reconfiguring the media path can be accomplished via signaling associated with the communication protocol used for the communication session.

FIGS. 6A-6B are mainly described with respect to a communication session that is a telephonic call. However, as already stated, the teachings herein are not limited to telephonic communication sessions. To illustrate, the communication session may be a video communication session and the external bypass step may require the user 502 to, for example, show a sensitive document, such as a driver's license or a passport. In an example, the modified stream may include a blurred version of the sensitive document. In the case of a video session, modifying the path of the video stream can mean or include disconnecting a video session of the user device 506 and reconnecting the video session to the third-party system 516. In an example, a pop-up window may be presented at the user device 506 indicating to the user that the video session will be momentarily disconnected while the user is being re-connected to the third-party system 516. At the completion of the external bypass step, the video session is disconnected from the third-party system 516 and reconnected to the agent device 508 via the un-anchored agent handler 510.

Figure 7:
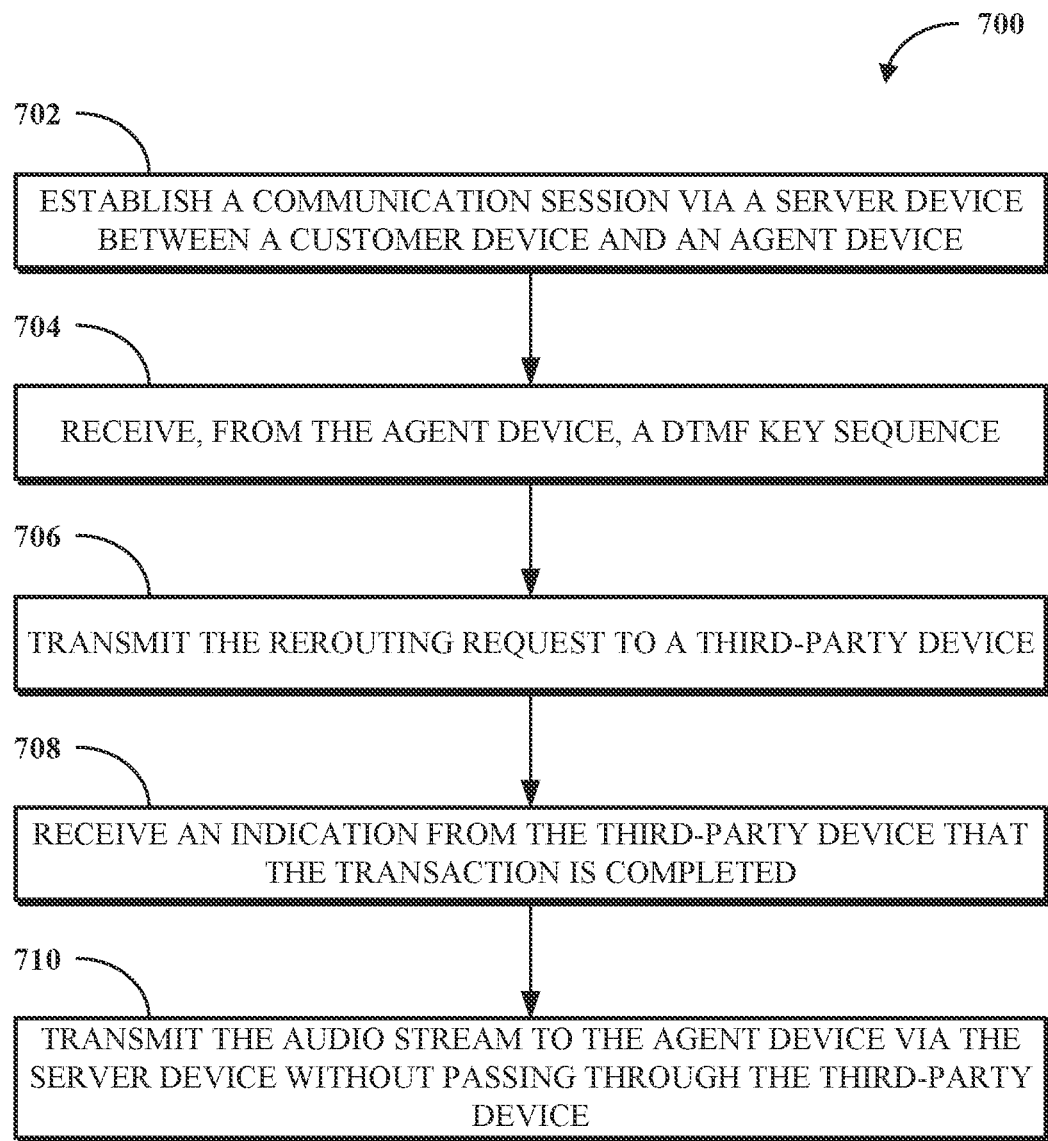
FIG. 7 is a flowchart of an example of a technique for invoking an external bypass step based on input from an un-anchored agent.

To further describe some implementations in greater detail, reference is next made to examples of techniques which may be performed by or using a system for call flow modification based on un-anchored agent input and/or property modification of a communication session during the communication session. FIG. 7 is a flowchart of an example of a technique 700 for invoking an external bypass step based on input from an un-anchored agent. The technique 700 can be executed using computing devices, such as the systems, hardware, and software described with respect to FIGS. 1-6B. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof. The technique 700 can be implemented by one or more devices implementing an un-anchored agent handler, such as un-anchored agent handler of FIGS. 6A-6B.

At 702, a first communication session is established via a server device between a customer device and an agent device. The server device can be one or more computer devices that implement the un-anchored agent handler 510 of FIGS. 6A-6B. The agent device is associated with an un-anchored agent. As such, the agent device can be said to be an un-anchored device since no particular, identifiable agent is associated with the agent device at any time that the agent device is in use (such as in communication sessions).

At 704, a (first) DTMF key sequence is received from the agent device. The DTMF key sequence is an external bypass step indicator. As such, the DTMF key sequence can be indicative of a rerouting request of an audio stream of the first communication session. That is, in response to receiving the DTMF key sequence, the server device (e.g., the un-anchored agent handler 510 therein) may initiate steps (e.g., a workflow) that results, at least in part, in the rerouting of the audio stream of the first communication session, as described with respect to FIG. 6B. The DTMF key sequence can be indicative of a third-party device (e.g., of an external bypass step handler). As mentioned above, different DTMF key sequences may be associated with different external bypass tasks. As such, the DTMF key sequence indicates (e.g., identifies) the third-party device and/or a third-party service operating therein that is to perform the external bypass step. The server device may include or have access to configurations that map DTMF key sequences to respective external bypass step handlers.

At 706, the rerouting request is transmitted to the third-party device. The rerouting request may be transmitted by the server device. The third-party device can be the third-party system 516 of FIG. 6B. The third-party device can be or include one or more computing devices. Transmitting the rerouting request to the third-party device can mean that the server device and the third-party device initiate a process, such as a process that includes a SIP invite signaling, that results in the audio stream being routed from the customer device to the server device without first passing through (e.g., being relayed by) the server device. As described above, the DTMF key sequence indicates to the third-party device that it is to process a transaction with a user of the customer device.

In this context, "transaction" is not limited in any particular way and may encompass a workflow, process, series of operations, series of actions, or any other related sequence. In an example, the transaction relates to obtaining payment information from the user of the customer device. More broadly, the transaction may relate to or require obtaining user information that is subject to a data protection regulation, a data privacy regulation, or a compliance regulation (collectively, compliance regulation) or user information that the agent should not receive. As such, the transaction can be referred to as a compliance transaction, the third-party system may be referred to as a compliance processing system, and the external bypass step handler may be referred to as an external bypass compliance step handler. As described above, the transaction is completed while a signaling channel associated with the communication session between the customer device and the agent device is maintained.

At 708, the server device receives an indication from the third-party device that the transaction is completed. At 710, in response to receiving the indication that the transaction is completed, the server device (i.e., the un-anchored agent handler therein) causes the audio stream to be transmitted to the agent device via the server device without passing through the third-party device. Rerouting the audio stream can be accomplished via SIP signaling, as described above.

In an example, the server device may receive from the agent device a second DTMF key sequence indicative of an identifier associated with the transaction. The second DTMF key sequence can be or can be similar to the unique code described above. In response to receiving the second DTMF key sequence, the server device transmits information associated with the first communication session to the third-party device. For example, the information associated with the first communication session may include SIP session information such as one or more of SIP Uniform Resource Identifiers (URIs) for the customer device, Real-Time Transport Protocol (RTP) parameters, RTP Control Protocol (RTCP) parameters, media capabilities (e.g., codec and media formats) of the customer device and/or the agent device, customer and/or agent device information (such as software, version, and device type), and/or any other SIP session information. The first DTMF key sequence and the second DTMF key sequence can be one DTMF sequence where a first portion thereof is considered to be the first DTMF key sequence and a second portion thereof is considered to be the second DTMF key sequence.

In an example, a second communication session is established between the server device and the third-party device. The server device receives a modified audio stream from the audio stream. The modified audio stream is such that sensitive data in the audio stream are obfuscated in the modified audio stream. The server device transmits the modified audio stream to the agent device. In an example, the server device uses SIP signaling to negotiate a redirection of the audio stream between the agent device and the third-party device.

As can be appreciated and alluded to herein, multiple protocols may be used in a communication session. For example, SIP and RTP may be used in a communication session. SIP may be used for initiating, modifying, and terminating communication sessions, while RTP may be used for the actual transport of audio (or other media, such as video or other real-time data) within the communication session. Said another way, SIP can be used to handle the setup and control aspects of the communication session, while RTP can be used to handle the actual transmission of media packets. As such, negotiating a redirection of the audio stream between the agent device and the third-party device can utilize one or more communication protocols.

Figure 8:
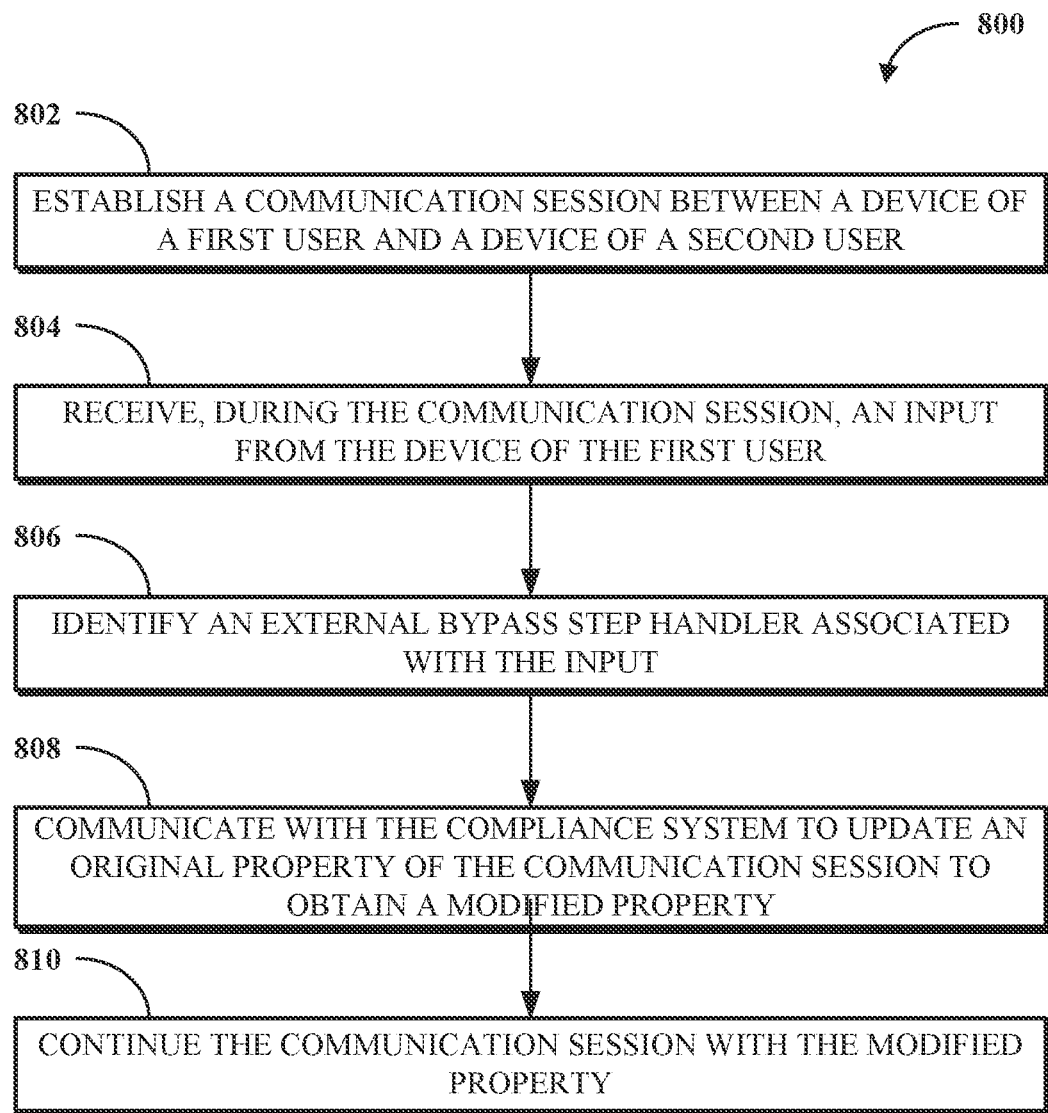
FIG. 8 is a flowchart of an example of a technique for modifying communication session properties.

FIG. 8 is a flowchart of an example of a technique 800 for modifying communication session properties. The technique 800 can be executed using computing devices, such as the systems, hardware, and software described with respect to FIGS. 1-6B. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof. The technique 800 can be implemented by a server (e.g., one or more devices) implementing an un-anchored agent handler, such as the un-anchored agent handler 510 of FIGS. 6A-6B.

At 802, a communication session is established between a device of a first user and a device of a second user. The first user, the device of the first user, the second user, and the device of the second user can be, respectively, the agent 504, the agent device 508, the user 502, and the user device 506 of FIGS. 6A-6B. The communication session can be established via or by the un-anchored agent handler. The communication session can be or include at least one of a voice call, video call, or a chat session (which can also include or encompass Short Message Service (SMS) communication sessions).

At 804, an input is received, such as by the un-anchored agent handler, from the device of the first user. The input can be an external bypass step indicator. The input can be a DTMF key sequence. In another example, the communication session can be a chat-session and the input can be a slash-style command. The input can indicate a request to update an original property of the communication session associated with a path of media communication between the device of the first user and the device of the second user. The original property can be or relate to a path or a destination of a media stream initiating from the device of the second user of the communication session. In an example, the communication session can be associated with a specific transaction flow based on the input.

At 806, an external bypass step handler associated with the input is identified. Identifying the external bypass step handler can include identifying a service that implements the external bypass step. The external bypass step handler can be a payment processing system. The external bypass step handler can implement a process that includes obtaining an image of a document from the second user.

At 808, the server communicates with the external bypass step handler to update the original property of the communication session to obtain a modified property. The original property can indicate that a media stream of the communication session passes via the server and the modified property indicates that the media stream is transmitted from the device of the second user to the external bypass step handler and is not received at the server.

At 810, the communication session is continued with the modified property. That the communication session is continued with the modified property can include that a signaling channel of the communication session remains open (e.g., is maintained) but that a destination of a media stream of the communication session is changed. In an example, the communication session is reverted to the original property in response to receiving an indication from the external bypass step handler.

For simplicity of explanation, the techniques 700 and 800 of FIGS. 7 and 8, respectively, are each depicted and described herein as a respective series of steps or operations. However, the respective steps or operations of each of the techniques 700 and 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The disclosure presented herein may be considered in view of the following clauses.

Example Clause A: A method, comprising: establishing a communication session between a device of a first user and a device of a second user; receiving, during the communication session, an input from the device of the first user, wherein the input indicates a request to update an original property of the communication session associated with a path of media communication between the device of the first user and the device of the second user; identifying an external bypass step handler associated with the input; communicating with the external bypass step handler to update the original property of the communication session to obtain a modified property; and continuing the communication session with the modified property.

Example Clause B: The method of Example Clause A, wherein media exchanged during the communication session comprises at least one of a voice data, video data, or a chat data.

Example Clause C: The method of Example Clause A or Example Clause B, wherein the input comprises a Dual Tone Multi-Frequency (DTMF) key sequence.

Example Clause D: The method of any one of Example Clauses A-C, further comprising: reverting to the original property in response to receiving an indication from the external bypass step handler.

Example Clause E: The method of any one of Example Clauses A-D, wherein the input indicates that the external bypass step handler is a compliance processing system.

Example Clause F: The method of any one of Example Clauses A-E, further comprising: associating the communication session with a transaction flow based on the input.

Example Clause G: The method of any one of Example Clauses A-F, wherein the original property indicates that a media stream of the communication session passes via a server and the modified property indicates that the media stream is transmitted from the device of the second user to the external bypass step handler and is not received at the server.

Example Clause H: The method of any one of Example Clauses A-G, wherein continuing the communication session with the modified property comprises: maintaining a signaling channel of the communication session; and changing a destination of a media stream of the communication session.

Example Clause I: A server, comprising: one or more memories; and one or more processors, the one or more processors configured to execute instructions stored in the one or more memories to: establish a communication session between a device of a first user and a device of a second user; receive, during the communication session, an input from the device of the first user, wherein the input indicates a request to update an original property of the communication session associated with a path of media communication between the device of the first user and the device of the second user; identify an external bypass step handler associated with the input; communicate with the external bypass step handler to update the original property of the communication session to obtain a modified property; and continue the communication session with the modified property.

Example Clause J: The server of Example Clause I, wherein audio streams are exchanged during the communication session.

Example Clause K: The server of Example Clause I or Example Clause J, wherein the communication session is a chat session and the input comprises a slash-style command.

Example Clause L: The server of any one of Example Clauses I-K, wherein the one or more processors is further configured to execute instructions stored in the one or more memories to: revert to the original property in response to receiving an indication from the external bypass step handler that an external bypass step executable by the external bypass step handler is completed.

Example Clause M: The server of any one of Example Clauses I-L, wherein the input indicates that the external bypass step handler obtains personally identifying data from the second user.

Example Clause N: The server of any one of Example Clauses I-M, wherein the communication session is associated with a specific transaction flow based on the input.

Example Clause O: The server of any one of Example Clauses I-N, wherein the original property and the modified property indicate different destinations for a media stream of the communication session.

Example Clause P: The server of any one of Example Clauses I-O, wherein to continue the communication session with the modified property comprises to: maintain a signaling channel of the communication session remains open.

Example Clause Q: A non-transitory computer readable medium storing instructions operable to cause one or more processors to perform operations comprising: establishing a communication session between a device of a first user and a device of a second user; receiving, during the communication session, an input from the device of the first user, wherein the input indicates a request to update an original property of the communication session associated with a path of media communication between the device of the first user and the device of the second user; identifying an external bypass step handler associated with the input; communicating with the external bypass step handler to update the original property of the communication session to obtain a modified property; and continuing the communication session with the modified property.

Example Clause R: The non-transitory computer readable medium of Example Clause Q, wherein the input comprises a Dual Tone Multi-Frequency (DTMF) key sequence.

Example Clause S: The non-transitory computer readable medium of Example Clause Q or Example Clause R, wherein continuing the communication session with the modified property comprises: changing a destination of a media stream of the communication session.

Example Clause T: The non-transitory computer readable medium of any one of Example Clauses Q-S, wherein the input indicates that the external bypass step handler obtains credit card information from the second user.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    establishing a communication session between a device of a first user and a device of a second user;
    receiving, during the communication session, an input from the device of the first user, wherein the input indicates a request to update an original property of the communication session associated with a path of media communication between the device of the first user and the device of the second user;
    identifying an external bypass step handler associated with the input;
    communicating with the external bypass step handler to update the original property of the communication session to obtain a modified property; and
    continuing the communication session with the modified property.

2. The method of claim 1, wherein media exchanged during the communication session comprises at least one of a voice data, video data, or a chat data.

3. The method of claim 1, wherein the input comprises a Dual Tone Multi-Frequency (DTMF) key sequence.

4. The method of claim 1, further comprising:
    reverting to the original property in response to receiving an indication from the external bypass step handler.

5. The method of claim 1, wherein the input indicates that the external bypass step handler is a compliance processing system.

6. The method of claim 1, further comprising:
    associating the communication session with a transaction flow based on the input.

7. The method of claim 1, wherein the original property indicates that a media stream of the communication session passes via a server and the modified property indicates that the media stream is transmitted from the device of the second user to the external bypass step handler and is not received at the server.

8. The method of claim 1, wherein continuing the communication session with the modified property comprises:
    maintaining a signaling channel of the communication session; and
    changing a destination of a media stream of the communication session.

9. A server, comprising:
    one or more memories; and
    one or more processors, the one or more processors configured to execute instructions stored in the one or more memories to:

establish a communication session between a device of a first user and a device of a second user;

receive, during the communication session, an input from the device of the first user, wherein the input indicates a request to update an original property of the communication session associated with a path of media communication between the device of the first user and the device of the second user;

identify an external bypass step handler associated with the input;

communicate with the external bypass step handler to update the original property of the communication session to obtain a modified property; and continue the communication session with the modified property.

10. The server of claim 9, wherein audio streams are exchanged during the communication session.

11. The server of claim 9, wherein the communication session is a chat session and the input comprises a slash-style command.

12. The server of claim 9, wherein the one or more processors is further configured to execute instructions stored in the one or more memories to:

revert to the original property in response to receiving an indication from the external bypass step handler that an external bypass step executable by the external bypass step handler is completed.

13. The server of claim 9, wherein the input indicates that the external bypass step handler obtains personally identifying data from the second user.

14. The server of claim 9, wherein the communication session is associated with a specific transaction flow based on the input.

15. The server of claim 9, wherein the original property and the modified property indicate different destinations for a media stream of the communication session.

16. The server of claim 9, wherein to continue the communication session with the modified property comprises to:

maintain a signaling channel of the communication session remains open.

17. A non-transitory computer readable medium storing instructions operable to cause one or more processors to perform operations comprising:

establishing a communication session between a device of a first user and a device of a second user;

receiving, during the communication session, an input from the device of the first user, wherein the input indicates a request to update an original property of the communication session associated with a path of media communication between the device of the first user and the device of the second user;

identifying an external bypass step handler associated with the input;

communicating with the external bypass step handler to update the original property of the communication session to obtain a modified property; and continuing the communication session with the modified property.

18. The non-transitory computer readable medium of claim 17, wherein the input comprises a Dual Tone Multi-Frequency (DTMF) key sequence.

19. The non-transitory computer readable medium of claim 17, wherein continuing the communication session with the modified property comprises:

changing a destination of a media stream of the communication session.

20. The non-transitory computer readable medium of claim 17, wherein the input indicates that the external bypass step handler obtains credit card information from the second user.

* * * * *